(12) United States Patent
Iizumi et al.

(10) Patent No.: US 11,609,387 B2
(45) Date of Patent: Mar. 21, 2023

(54) FIBER OPTIC MICRO CONNECTOR

(71) Applicant: Senko Advanced Components Inc, Marlborough, MA (US)

(72) Inventors: Kenji Iizumi, Tokyo (JP); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 69 days.

(21) Appl. No.: 17/078,090

(22) Filed: Oct. 22, 2020

(65) Prior Publication Data
US 2021/0124131 A1 Apr. 29, 2021

Related U.S. Application Data

(60) Provisional application No. 62/925,900, filed on Oct. 25, 2019.

(51) Int. Cl.
*G02B 6/38* (2006.01)

(52) U.S. Cl.
CPC ......... *G02B 6/3871* (2013.01); *G02B 6/3843* (2013.01); *G02B 6/3893* (2013.01)

(58) Field of Classification Search
CPC ................ G02B 6/3871; G02B 6/3843; G02B 6/3893
See application file for complete search history.

(56) References Cited

U.S. PATENT DOCUMENTS

| | | | |
|---|---|---|---|
| 5,212,752 A | 5/1993 | Stephenson et al. | |
| 5,598,495 A | 1/1997 | Rittle et al. | |
| 6,217,231 B1 | 4/2001 | Mesaki et al. | |
| 9,612,406 B1* | 4/2017 | Iizumi | G02B 6/3843 |
| 2006/0193562 A1 | 8/2006 | Theuerkorn | |
| 2009/0220227 A1 | 9/2009 | Wong et al. | |
| 2010/0310213 A1 | 12/2010 | Lewallen et al. | |
| 2016/0131852 A1* | 5/2016 | Theuerkorn | G02B 6/3851 385/78 |
| 2017/0242199 A1* | 8/2017 | Gniadek | G02B 6/428 |
| 2017/0269315 A1 | 9/2017 | Yeh et al. | |
| 2018/0164510 A1* | 6/2018 | Shouda | G02B 6/4292 |
| 2020/0326495 A1 | 10/2020 | Liao et al. | |

OTHER PUBLICATIONS

International Search Report and Written Opinion, Application No. PCT/US20/058358, dated Mar. 4, 2021, pp. 11.
International Search Report and Written Opinion, Application No. PCT/US20/058358, dated Mar. 4, 2021, 11 pages.

* cited by examiner

*Primary Examiner* — Tina M Wong

(57) ABSTRACT

A micro connector kit including a ferrule assembly, an optical sub-assembly ("OSA") and a micro connector. The ferrule assembly is coupled to an optical fiber and includes a ferrule. The OSA can receive an electric signal and transmit an optical signal or receive an optical signal and transmit an electric signal. The OSA includes a receptacle sized and shaped to receive the ferrule of the ferrule assembly to form an optical connection between the ferrule assembly and the OSA. The micro connector secures the optical connection between the ferrule assembly and the OSA. The micro connector includes a micro connector housing that forms a direct, mating connection with the OSA to secure the optical connection between the ferrule assembly and the OSA. The connection is made using only a very small space, allowing more ferrule assembly and OSA connections to be made in a smaller area.

20 Claims, 3 Drawing Sheets

FIBER OPTIC MICRO CONNECTOR

CROSS-REFERENCE TO RELATED APPLICATION

This application claims priority to U.S. Provisional App. No. 62/925,900, filed Oct. 25, 2019, the entirety of which is hereby incorporated by reference.

FIELD

The present disclosure generally relates to fiber optic connections, and, more specifically, to a fiber optic connector.

BACKGROUND

Optical connectors are used within optical communication networks to interconnect optical cables to optical devices or other optical cables. Optical connections typically involve two optical connectors connected together. Typically, optical connectors include housings that mate with one another to form the optical connection. The space required for the optical connector is dictated by the housings and associated latching features used to connect the optical connectors.

SUMMARY

In one aspect, a micro connector kit comprises a ferrule assembly coupled to an optical fiber. The ferrule assembly includes a ferrule. An optical sub-assembly is configured to receive an electric signal and transmit an optical signal. The optical sub-assembly includes a receptacle sized and shaped to receive the ferrule of the ferrule assembly for forming an optical connection between the ferrule assembly and the optical sub-assembly. A micro connector is configured to secure the optical connection between the ferrule assembly and the optical sub-assembly. The micro connector includes a micro connector housing configured to form a direct, mating connection with the optical sub-assembly to secure the optical connection between the ferrule assembly and the optical sub-assembly.

In another aspect, a micro connector for securing an optical connection between a ferrule assembly and an optical sub-assembly comprises a micro connector housing defining a lumen sized and shaped to receive the ferrule assembly and the optical sub-assembly. The micro connector housing includes a first orienter configured to engage the ferrule assembly to orient the ferrule assembly relative to the micro connector housing. A second orienter is configured to engage the optical sub-assembly to orient the optical sub-assembly relative to the micro connector housing. An optical sub-assembly connector is configured to engage the optical sub-assembly to secure the optical sub-assembly to the micro connector housing.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
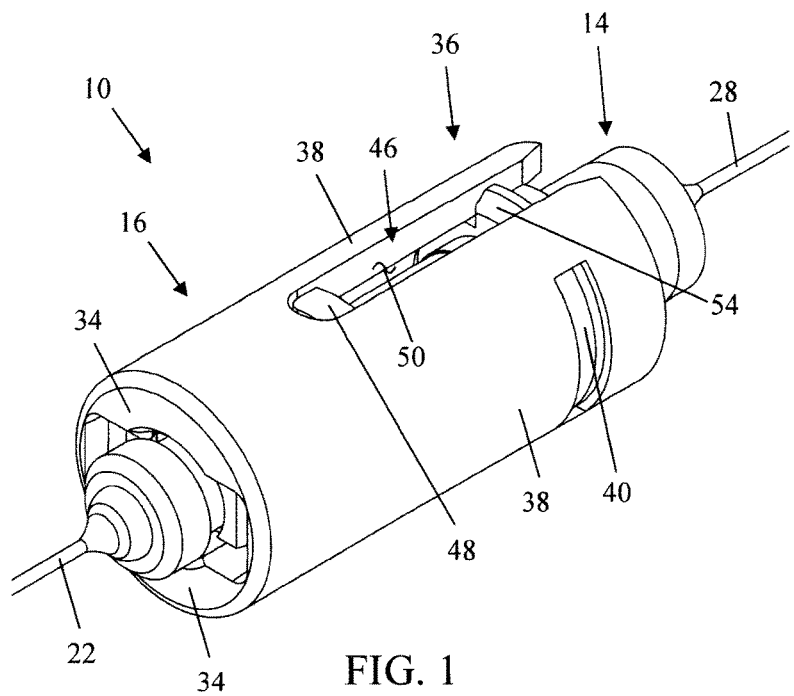
FIG. 1 is a perspective of a micro connector assembly according to one embodiment of the present disclosure.
Figure 2:
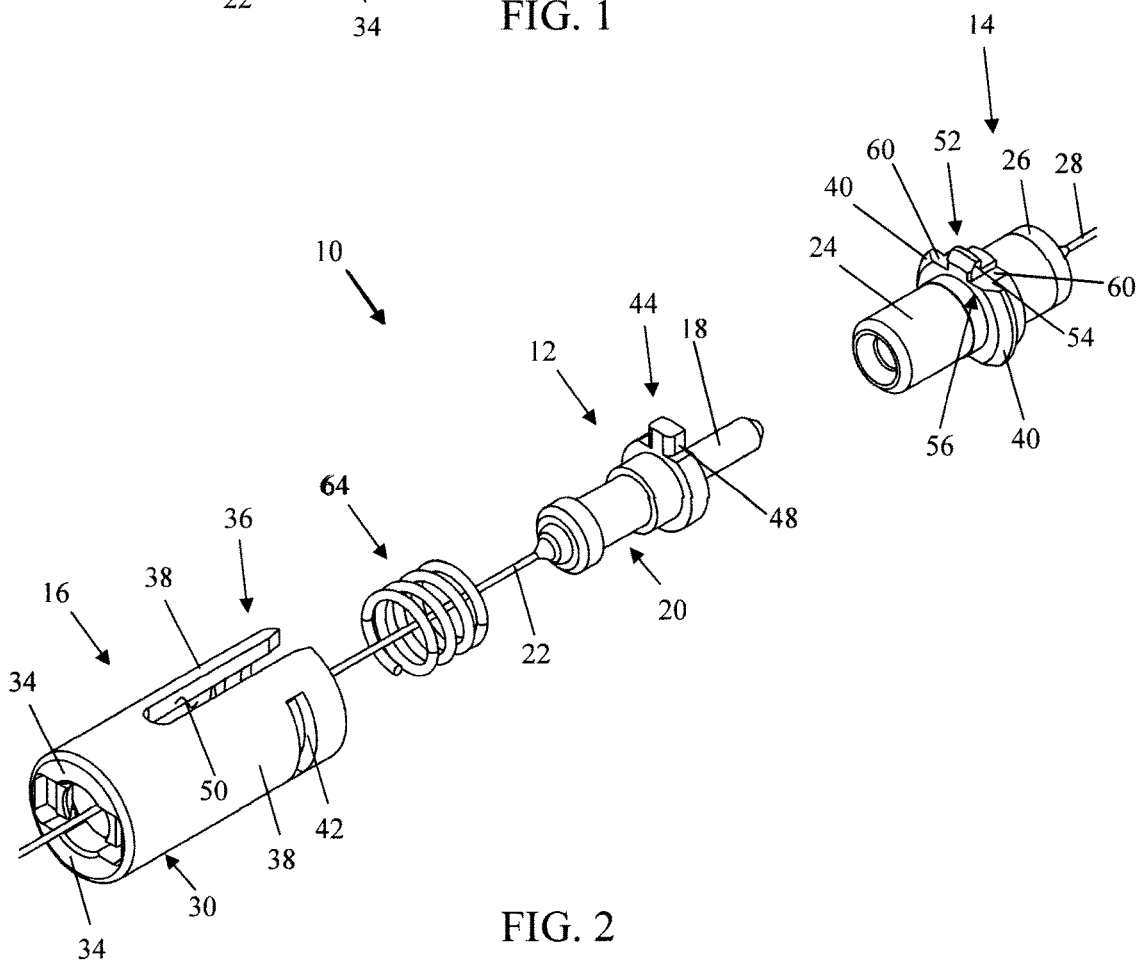
FIG. 2 is an exploded perspective of the micro connector assembly.
Figure 3:
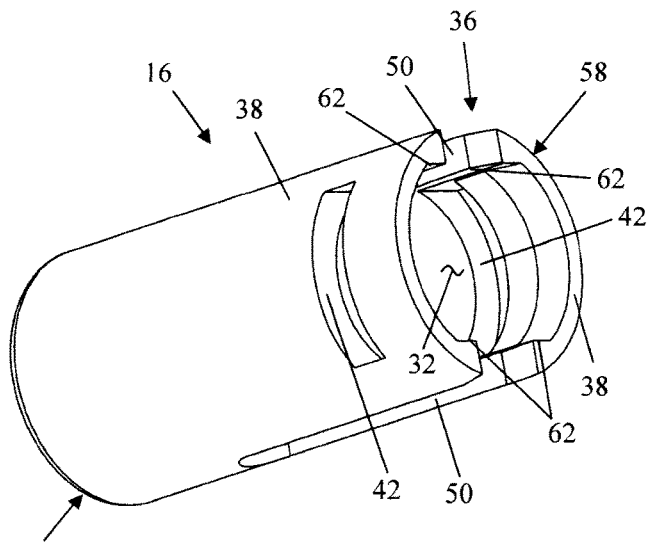
FIG. 3 is a perspective of a micro connector of the micro connector assembly.

Referring to FIGS. 1-3, a fiber optic connector assembly according to one embodiment of the present disclosure is generally indicated at reference numeral 10. The fiber optic connector assembly 10, or more particularly a collection if its component parts may be referred to as a "kit." The fiber optic connector assembly 10 includes a ferrule assembly 12, an optical sub-assembly ("OSA") 14 and a micro connector 16 configured to secure the ferrule assembly and the OSA together. The fiber optic connector assembly 10 is used to form a fiber optic connection. When the fiber optic connector assembly 10 is assembled together, as shown in FIG. 1, an optical connection (e.g., a fiber optic connection) is formed between the ferrule assembly 12 and the OSA 14 that enables communication (e.g., optical communication) therebetween in an optical communications network. Other configurations of the fiber optic connector assembly 10 are within the scope of the present disclosure. For example, the connector assembly could make electrical or other types of connections instead of or in addition to an optical connection.

The ferrule assembly 12 includes a ferrule 18. The ferrule 18 is configured to mate with the OSA 14 to form the optic connection between the ferrule assembly 12 and the OSA. The ferrule assembly 12 also includes a ferrule body or frame 20 supporting the ferrule 18. The ferrule 18 extends distally from the ferrule body 10. As will become apparent, the ferrule body 20 is sized and shaped to be received by the micro connector 16. The ferrule body 20 has a generally circular cross-sectional shape, although other shapes are within the scope of the present disclosure. The ferrule assembly 12 is attached to the end of an optical fiber 22 (e.g., a single optical fiber). In one embodiment, the optical fiber 22 is a polarization-maintaining (PM) optical fiber, although other optical fibers are within the scope of the present disclosure. The optical fiber 22 is attached to the proximal end of the ferrule body 20.

Figure 4:
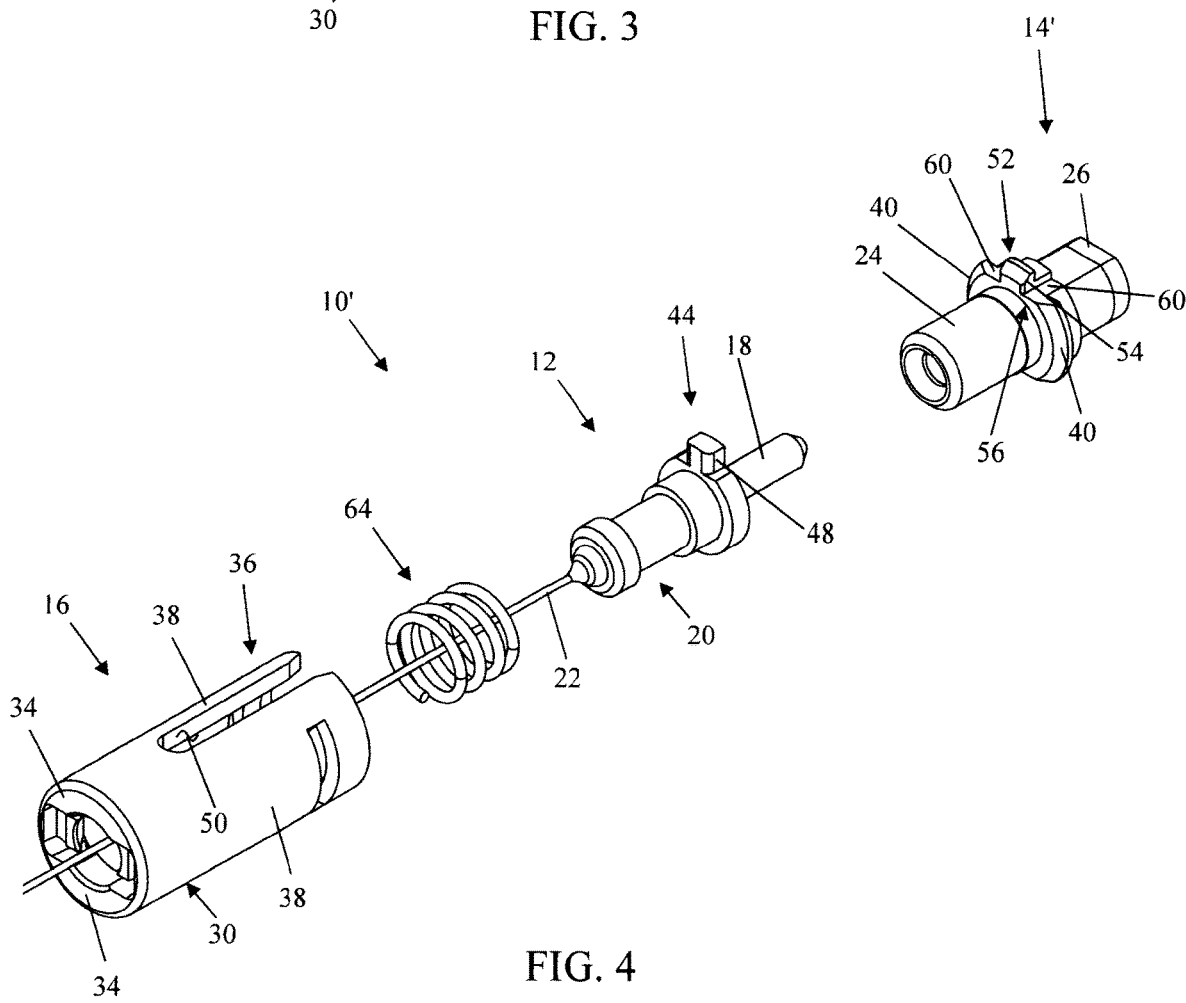
FIG. 4 is an exploded perspective of a micro connector assembly according to another embodiment of the present disclosure.

The OSA 14 is configured to form an optical connection with the ferrule assembly 12. The OSA 14 is configured to convert optical signals received from the ferrule assembly 12 into electrical signals and/or convert received electrical signals into optical signals for transmission to the ferrule assembly. The OSA 14 may be a transmitter optical sub-assembly ("TOSA"), a receiver optical sub-assembly ("ROSA"), or a bi-directional optical sub-assembly ("BOSA"). As generally known in the art, a transmitter optical sub-assembly coverts electrical signals to optical signals, a receiver optical sub-assembly coverts optical signals to electrical signals and a bi-directional optical sub-assembly can do both, covert optical signals to electrical signals and vice versa. The OSA 14 is configured to receive the ferrule 18 of the ferrule assembly 12 for forming optical connection between the ferrule assembly and the OSA. The OSA 14 includes a receptacle or sleeve 24 for receiving the ferrule 18 of the ferrule assembly 12. The receptacle 24 defines a lumen sized and shaped to receive the ferrule 18 when the ferrule is inserted into the OSA 14. The OSA 14 also includes a diode 26 for converting the optical signals into electrical signals and/or vice versa. For example, the diode 26 can be a laser diode for converting electrical signals into optical signals or a photo diode for converting optical signals into electrical signals. The OSA 14 may also include a mating ferrule (not shown) that facilities the optical connection between the ferrule 18 of the ferrule assembly 12 and the diode 26. In the illustrated embodiment (FIGS. 1 and 2), the OSA 14 is a pig tail style or type OSA having an electrical cable 28 extending therefrom. Other styles or types of OSAs are within the scope of the present disclosure. For example, the OSA may be a fiber stub type OSA. An example of such an OSA is generally indicated at reference numeral 14' in FIG. 4. In this embodiment, the OSA 14' is generally the same the OSA 14 in FIGS. 1 and 2, except that the OSA 14' is a fiber stub type OSA. Otherwise, the fiber optic connector assembly 10' in FIG. 4 is generally the same as the fiber optic connector assembly 10 in FIGS. 1 and 2.

Still referring to FIGS. 1-3, the micro connector 16 is configured to secure the optical connection between the ferrule assembly 12 and the OSA 14. The micro connector 16 includes a micro connector body or housing 30. The micro connector housing 30 is cylindrical in shape, conforming to the generally cylindrical shapes of the ferrule assembly 12 and the OSA 14. The housing 30 defines a lumen 32 (FIG. 3) sized and shaped to receive the ferrule assembly 12 (broadly, at least a portion of the ferrule assembly) and the OSA 14 (broadly, at least a portion of the OSA). As shown in FIG. 1, the ferrule assembly 12 and the OSA 14 are disposed (broadly, at least partially disposed) in the lumen 32 when the micro connector 16 secures the optical connection between the ferrule assembly and the OSA. The lumen 32 has opposite open proximal and distal ends. The open proximal end of the lumen 32 allows the optical fiber 22 to extend out of the micro connector 16. The open distal end of the lumen 32 allows the ferrule assembly 12 and the OSA 14 to move or slide proximally into the housing 30 of the micro connector 16. The micro connector 16 includes at least one stop 34 configured to prevent or block the ferrule assembly 12 and/or other components from moving out of the lumen 32 through the open proximal end. In the illustrated embodiment, the stop 34 is generally disposed at the open proximal end of the lumen 32. As shown in FIG. 1, the ferrule assembly 12 and the OSA 14 are disposed (broadly, at least partially disposed) in the lumen 32 when the micro connector housing 30 directly couples to the OSA to secure the optical connection between the ferrule assembly and the OSA.

The micro connector housing 30 is configured to attach to the OSA 14. Specifically, the micro connector housing 30 is configured to form a direct, mating connection with the OSA 14 to secure the optical connection between the ferrule assembly 12 and the OSA. The micro connector 16 (e.g., micro connector housing 30) includes an optical sub-assembly connector 36 ("an OSA connector"). The OSA connector 36 is configured to directly engage the OSA 14 to secure the OSA to the micro connector housing 30. In the illustrated embodiment, the OSA connector 36 is configured to form a snap fit connection with the OSA 14. The OSA connector 36 (e.g., the micro connector housing 20), includes at least one resiliently deflectable portion 38. In the illustrated embodiment, the OSA connector 36 includes two, generally opposing, deflectable portions 38. Each deflectable portion 38 extends distally from a base or proximal portion of the micro connector housing 30. Each deflectable portion 38 is configured to engage the OSA 14 to secure the OSA to the micro connector 16. As shown in FIG. 2, the OSA 14 includes at least one detent 40. In the illustrated embodiment, the OSA includes two detents 40, on generally opposite sides of the OSA. In the illustrated embodiment, the detents 40 are generally radially outward extending flanges. The micro connector housing 30 engages the detent 40 of the OSA 14 to secure the optical connection between the ferrule assembly 12 and the OSA. Specifically, the detents 40 form a snap-fit connection with the OSA connector 36 of the micro connector housing 30. Each deflectable portion 38 of the OSA connector 36 is configured to engage one of the detents 40 of the OSA. Each deflectable portion 38 includes a recess or aperture 42 sized and shaped to receive one of the detents 40 of the OSA to secure the OSA to the micro connector 16 (e.g., micro connector housing 30). In the illustrated embodiment, the aperture 42 of each deflectable portion 38 extends lengthwise in a circumferential direction with respect to the housing 30. The aperture 42 extends from the lumen 32 of the micro connector housing 30 toward and through an exterior surface of the micro connector housing (e.g., deflectable portion 38). To connect the micro connector 16 and the OSA 14 together, the OSA is moved proximally, relative to the micro connector 16, into the lumen 32 of the micro connector housing 30. As the OSA 14 is moved proximally, each detent 40 engages a deflectable portion 38, deflecting the deflectable portion generally radially outward. The proximal edge margin of the detents 40 are chamfered or angled to facilitate the deflection of the deflectable portions 38. Once the detents 40 become aligned with the apertures 42, the deflectable portions 38 return or snap-back to their undeformed (e.g., undeflected state), securing the detents 40 in the apertures 42 (FIG. 1). It will be understood that the detents 40 rather than the deflectable portions 38 could resiliently deflect, or that both the deflectable portions 38 and detents 40 could deflect.

In conventional arrangements, OSAs are attached or mounted to a fiber optic connector housing that are able to connect (e.g., matingly connect) to other fiber optic connector housings in a secure manner. Accordingly, conventional OSAs need to be attached to additional structure for forming secure connections with other fiber optic comments (e.g., connectors, ferrules, etc.). In contract, the micro connector 16 of the present disclosure can attach directly to the OSA 14 to secure the optical connection between the ferrule assembly 12 and the OSA, thereby eliminating the need to attach the OSA to additional structure that typical forms the secure connections.

In the illustrated embodiment, the micro connector 16 is an integral, one-piece component. For example, the micro connector 16 may be a single piece of molded plastic. In other embodiments, the micro connector 16 may be formed from two or more pieces coupled or secured together.

Still referring to FIGS. 1-3, the ferrule assembly 12, the OSA 14 and the micro connector 16 may each include on or more orienters for orienting and aligning the ferrule assembly, and the OSA relative to one another. The ferrule assembly 12 includes a ferrule assembly orienter 44 and the micro connector 16 (e.g., micro connector housing 30) includes a micro connector orienter 46 (e.g., a first micro connector orienter). The ferrule assembly orienter 44 and the micro connector orienter 46 are configured to engage one another to orient the ferrule assembly 12 and the micro connector 16 relative to one another. In other words, the micro connector orienter 46 is, broadly, configured to engage the ferrule assembly 12 to orient the ferrule assembly relative to the micro connector housing 30. Moreover, the engagement between the ferrule assembly orienter 44 and the micro connector orienter 46 inhibits the ferrule assembly 12 and the micro connector 16 from rotating relative to one another. In the illustrated embodiment, the ferrule assembly orienter 44 comprises a protrusion 48 and the micro connector orienter 46 comprises a slot 50 (broadly, a recess) sized and shaped to receive the protrusion. The protrusion 48 extends radially outward from the ferrule body 20. The slot 50 has an open distal end to allow the protrusion 48 to be moved proximally into the slot. In the illustrated embodiment, the micro connector housing 30 defines two, generally opposing, slots 50 (FIG. 3). Each slot 50 is defined by opposing sides of the two deflectable portions 38 of the OSA connector 36. The protrusion 48 of the ferrule assembly orienter 44 may be received in either one of the two slots 50.

The OSA 14 includes a OSA orienter 52 (e.g., a first OSA orienter). The first OSA orienter 52 is configured to be engaged by the first micro connector orienter 46 to orient the OSA 14 relative to the micro connector 16. Accordingly, the first micro connector orienter 36 engages both the ferrule assembly 12 and the OSA 14. In the illustrated embodiment, the first OSA orienter 52 comprises a protrusion 54. The protrusion 54 extends radially outward from the receptacle 24. Like protrusion 48, the protrusion 54 is sized and shaped to be received by the slot 50 of the first micro connector orienter 46. In the illustrated embodiment, the OSA 14 includes another OSA orienter 56 (e.g., a second OSA orienter) and the micro connector 16 also includes another micro connector orienter 58 (e.g., a second micro connector orienter). The second OSA orienter 56 and the second micro connector orienter 58 are configured to engage one another to orient the ferrule assembly 12 and the micro connector 16 relative to one another. In other words, the second OSA orienter 56 is, broadly, configured to engage the OSA 14 to orient the OSA relative to the micro connector housing 30. In the illustrated embodiment, the second OSA orienter 56 comprises a plurality of (broadly, one or more) generally planar surfaces or flats 60 and the second micro connector orienter 58 comprises a plurality (broadly, one or more) of corresponding generally planar surfaces or flats 62. Each generally planar surface 60 of the OSA 14 corresponds to a planar surface 62 of the micro connector 16. In the illustrated embodiment, the generally planar surfaces 60 of the OSA 14 are on generally opposite sides of the detent 40 and the generally planar surfaces 62 of the micro connector 16 define at least a portion of the lumen 32 (e.g., a portion of a distal end of the lumen). In other words, the detents 40 with generally planar side surfaces 60 function as keys that are sized and shaped to correspond to the size and shape of the distal end of the lumen 32, such that the detents 40 can only be inserted into the lumen when in a specific orientation relative to the lumen. Moreover, the engagement (broadly, at least one of the engagement) between the first OSA orienter 52 and the first micro connector orienter 46 and/or the second OSA orienter 56 and the second micro connector orienter 58 inhibits the ferrule assembly 12 and the micro connector 16 from rotating relative to one another. Inhibiting the ferrule assembly 12, the OSA 14 and the micro connector 16 from rotating relative to one another reduces or inhibits stress on components of the system, such as the optical fiber 22 and or the electrical cable 28, which may otherwise damage these components. Other configurations of the orienters 44, 46, 52, 56, 58 are within the scope of the present disclosure. Maintenance of the proper orientation allows PM optical fibers in the ferrule assembly 12 and the OSA 14 to be properly aligned for transmission across the junction of the fibers.

Referring to FIG. 2, the micro connector assembly 10 may also include a spring 64, such as a coil spring. The spring 64 is configured to bias the ferrule assembly 12 toward the OSA 14. The biasing of the ferrule assembly 12 by the spring 64 helps maintain the optical connection between the ferrule assembly and the OSA 14. In the illustrated embodiment, one end of the spring 64 engages the micro connector 16 (e.g., stops 34) and the other end of the spring engages the ferrule assembly 12 and biases the ferrule assembly in a direction out of the housing 30 toward the OSA 14.

In operation, the micro connector 16 secures the optical connection between the ferrule assembly 12 and the OSA 14. To assemble the micro connector assembly 10, initially the spring 64 and the ferrule assembly 12 are inserted proximally into the lumen 32 of the micro connector housing 30. To insert the ferrule assembly 12 into the lumen 32, the ferrule assembly is oriented (e.g., rotated) relative to the micro connector 16 so that the ferrule assembly orienter 44 aligned with the first micro connector orienter 46. After the ferrule assembly orienter 44 is aligned with the first micro connector orienter 46, the ferrule assembly 12 is moved proximally into the housing 30 of the micro connector 16. As the ferrule assembly 12 moves proximally, the protrusion 48 moves into and along the slot 50, thereby maintaining the orientation between the ferrule assembly 12 and the micro connector 16. After the ferrule assembly 12 is positioned in the housing 30, the OSA 14 and micro connector 16 are attached together. The OSA 14 and the micro connector 16 are oriented relative to one another such that the first OSA orienter 52 is aligned with the first micro connector orienter 46 and the second OSA orienter 56 is aligned with the second micro connector orienter 58. After the corresponding orienters 46, 52, 56, 58 are aligned, the OSA 14 is moved proximally, relative to the micro connector 16, into the lumen 32 of the micro connector housing 30. As the OSA 14 moves proximally, the protrusion 54 moves into and along the slot 50 and the one or more generally planar surfaces 60 move into and along the lumen 32 and along the generally planar surfaces 62 of the micro connector housing 30, thereby maintaining the orientation between the OSA and the micro connector 16. In addition, the detents 40 engage and deflect the OSA connector 36 (e.g., the deflectable portions 38 thereof), permitting the detents 40 to move into the lumen 32 and toward the apertures 42. Once the detents 40 of the OSA 14 align with the apertures 42 of the OSA connector 36, the OSA connector (e.g., deflectable portions 38) returns back to its undeflected state, thereby positioning detents in the apertures and securing the micro connector 16 to the OSA 14. Moreover, as the OSA 14 is moved into the micro connector 16, the ferrule 18 of the ferrule assembly 12 moves into the receptacle 24 of the OSA, thereby forming the optical connection between the ferrule assembly and the OSA. Preferably, coupling the OSA 14 and the micro connector 16 together compresses the spring 64, thereby biasing the ferrule assembly 12 toward the OSA.

Figure 5:
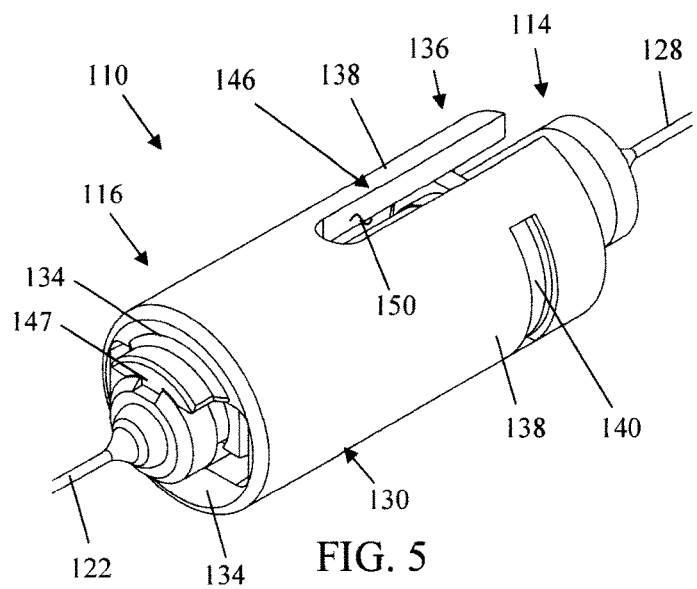
FIG. 5 is a perspective of a micro connector assembly according to another embodiment of the present disclosure.
Figure 6:
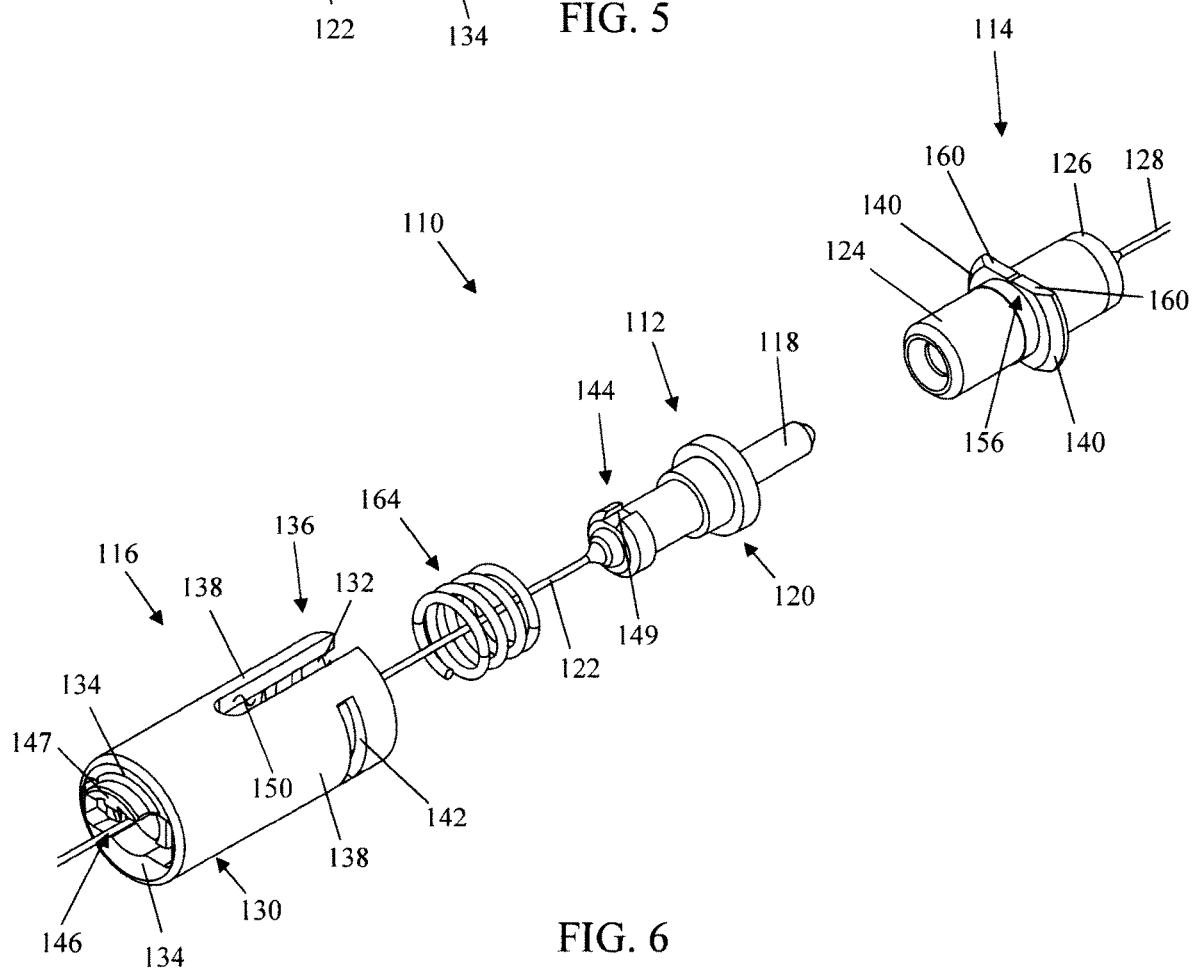
FIG. 6 is an exploded perspective of the micro connector assembly of FIG. 5.

Referring to FIGS. 5 and 6, another embodiment of the micro connector assembly according to the present disclosure is generally indicated by reference numeral 110. Micro connector assembly 110 is generally analogous to micro connector assembly 10 and, thus, for ease of comprehension, where similar, analogous or identical parts are used, reference numerals "100" units higher are employed. Accordingly, unless clearly stated or indicated otherwise, the above descriptions regarding micro connector assembly 10 also apply to micro connector assembly 110.

In this embodiment, the micro connector assembly 110 has a different configuration of orienters for orienting and aligning the ferrule assembly 112, the OSA 116 and/or the micro connector 116 relative to one another. For example, in this embodiment, the OSA 116 includes only one OSA orienter 156. In the illustrated embodiment, the OSA orienter 156 corresponds to the second OSA orienter 56, described above. In other embodiments, the one OSA orienter for OSA 114 may correspond to (e.g., be the) first OSA orienter 52, described above. Moreover, in the illustrated embodiment, the ferrule assembly orienter 144 comprises a slot 149 (broadly, a recess). The slot 149 is defined by the ferrule body 120. The micro connector 116 (e.g., micro connector housing 130) includes a micro connector orienter 146 (e.g., a first micro connector orienter) configured to engage the ferrule assembly orienter 144. In this embodiment, the micro connector orienter 146 comprises a protrusion 147. The slot 149 of the ferrule assembly orienter 144 is sized and shaped to receive the protrusion 147 of the micro connector orienter 146. In this embodiment, the micro connector orienter 146 is engaged only by the ferrule assembly 114, not the OSA 114. The protrusion 147 generally extends into the lumen 132 of the micro connector 116 to engage the ferrule assembly 112. When the ferrule assembly 112 moves proximally in the lumen 132 of the micro connector 116, the slot 149 is aligned with and moves along the protrusion 147 to keep the ferrule assembly 112 and the micro connector 116 oriented relative to one another. The micro connector housing 130 still defines slots 150 between the deflectable portions 138 of the OSA connector 136, in this embodiment. Otherwise, the micro connector assembly 110 is generally the same as micro connector assembly 10, and assembles, functions and operates in generally the same way.

In one embodiment, the micro connection assembly 10, 110 may come as a kit that includes the ferrule assembly 12, 112, the OSA 14, 14', 114, the micro connector 16, 116 and the spring 64, 164. In another embodiment, the micro connection assembly 10, 110 may come as a kit that includes the ferrule assembly 12, 112, the micro connector 16, 116 and the spring 64, 164 for connecting to an already existing OSA 14, 14', 114. Other kit configurations are within the scope of the present disclosure.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A micro connector kit comprising:
a ferrule assembly coupled to an optical fiber, the ferrule assembly including a ferrule having a tip end portion at which the ferrule is configured to terminate an optical fiber end;
an optical sub-assembly configured to receive an electric signal and transmit an optical signal, the optical sub-assembly including a receptacle having an open end, the receptacle being sized and shaped to receive the ferrule of the ferrule assembly by insertion of the tip end portion of the ferrule into the open end of the receptacle for forming an optical connection between the ferrule assembly and the optical sub-assembly; and
a micro connector configured to secure the optical connection between the ferrule assembly and the optical sub-assembly, the micro connector including a micro connector housing configured to form a direct, mating connection with the optical sub-assembly to secure the optical connection between the ferrule assembly and the optical sub-assembly,
wherein the ferrule assembly includes a ferrule assembly orienter and the micro connector includes a micro connector orienter configured to engage the ferrule assembly orienter to orient the ferrule assembly relative to the micro connector.

2. The micro connector kit of claim 1, wherein the micro connector housing includes a lumen sized and shaped to receive at least a portion of the ferrule assembly and the optical sub-assembly, wherein the ferrule assembly and the optical sub-assembly are at least partially disposed in the lumen when the micro connector housing forms the mating connection with the optical sub-assembly to secure the optical connection between the ferrule assembly and the optical sub-assembly.

3. The micro connector kit of claim 1, wherein the engagement between the ferrule assembly orienter and the micro connector orienter inhibits the ferrule assembly and micro connector from rotating relative to one another.

4. The micro connector kit of claim 3, wherein the ferrule assembly orienter comprises a protrusion and the micro connector orienter comprises a slot sized and shaped to receive the protrusion.

5. The micro connector kit of claim 3, wherein the micro connector orienter comprises a protrusion and the ferrule assembly orienter comprises a slot sized and shaped to receive the protrusion.

6. The micro connector kit of claim 1, wherein the optical sub-assembly includes a detent, the micro connector housing configured to engage the detent to secure the optical connection between the ferrule assembly and the optical sub-assembly.

7. The micro connector kit of claim 6, wherein the detent forms a snap-fit connection with the micro connector housing.

8. The micro connector kit of claim 1, wherein the optical sub-assembly includes a first optical sub-assembly orienter and the micro connector includes a first micro connector orienter configured to engage the first optical sub-assembly orienter to orient the optical sub-assembly relative to the micro connector.

9. The micro connector kit of claim 8, wherein the optical sub-assembly includes a second optical sub-assembly orienter and the micro connector includes a second micro connector orienter configured to engage the second optical sub-assembly orienter to orient the optical sub-assembly relative to the micro connector.

10. The micro connector kit of claim 9, wherein at least one of the engagement between the first optical sub-assembly orienter and the first micro connector orienter or the engagement between the second optical sub-assembly orienter and the second micro connector orienter inhibits the ferrule assembly and the micro connector from rotating relative to one another.

11. The micro connector kit of claim 9, wherein the first optical sub-assembly orienter comprises a protrusion and the first micro connector orienter comprises a slot sized and shaped to receive the protrusion.

12. The micro connector kit of claim 9, wherein the second optical sub-assembly orienter comprises a generally planar surface and the second micro connector comprises a corresponding generally planar surface.

13. The micro connector kit of claim 1, further comprising a spring configured to bias the ferrule assembly toward the optical sub-assembly.

14. The micro connector kit of claim 1, wherein the optical sub-assembly comprises one of a pig tail type optical sub-assembly or a fiber stub type optical sub-assembly.

15. A micro connector for securing an optical connection between a ferrule assembly and an optical sub-assembly, the micro connector comprising:
   a micro connector housing having a length defining a lumen sized and shaped to receive the ferrule assembly and the optical sub-assembly, the micro connector housing including:
   a first orienter configured to engage the ferrule assembly to orient the ferrule assembly relative to the micro connector housing;
   a second orienter configured to engage the optical sub-assembly to orient the optical sub-assembly relative to the micro connector housing; and
   an optical sub-assembly connector configured to engage the optical sub-assembly to secure the optical sub-assembly to the micro connector housing;
   wherein the micro connector housing is configured such that the ferrule assembly and the optical sub-assembly are each insertable lengthwise into the lumen and such that inside the lumen a tip end portion of the ferrule assembly at which an optical fiber end is terminated can be inserted into an open end of a receptacle of the optical sub-assembly.

16. The micro connector of claim 15, wherein the first orienter comprises a slot sized and shaped to receive a protrusion of the ferrule assembly.

17. The micro connector of claim 15, wherein the second orienter comprises a generally planar surface configured to engage a corresponding generally planar surface of the optical sub-assembly.

18. The micro connector of claim 15, wherein the optical sub-assembly connector is configured to form a snap-fit connection with the optical sub-assembly.

19. The micro connector of claim 18, wherein the optical sub-assembly connector includes an aperture extending from the lumen of the housing toward an exterior surface of the housing, the aperture being sized and shaped to receive a detent of the optical sub-assembly to secure the optical sub-assembly to the micro connector housing.

20. A micro connector kit comprising:
   a ferrule assembly coupled to an optical fiber, the ferrule assembly including a ferrule having a tip end portion at which the ferrule is configured to terminate an optical fiber end;
   an optical sub-assembly configured to receive an electric signal and transmit an optical signal, the optical sub-assembly including a receptacle having an open end, the receptacle being sized and shaped to receive the ferrule of the ferrule assembly by insertion of the tip end portion of the ferrule into the open end of the receptacle for forming an optical connection between the ferrule assembly and the optical sub-assembly; and
   a micro connector configured to secure the optical connection between the ferrule assembly and the optical sub-assembly, the micro connector including a micro connector housing configured to form a direct, mating connection with the optical sub-assembly to secure the optical connection between the ferrule assembly and the optical sub-assembly,
   wherein the optical sub-assembly includes a first optical sub-assembly orienter and the micro connector includes a first micro connector orienter configured to engage the first optical sub-assembly orienter to orient the optical sub-assembly relative to the micro connector.

* * * * *